Sept. 11, 1923.
J. L. MILLER
VEHICLE SPRING
Filed April 9, 1921
1,467,870
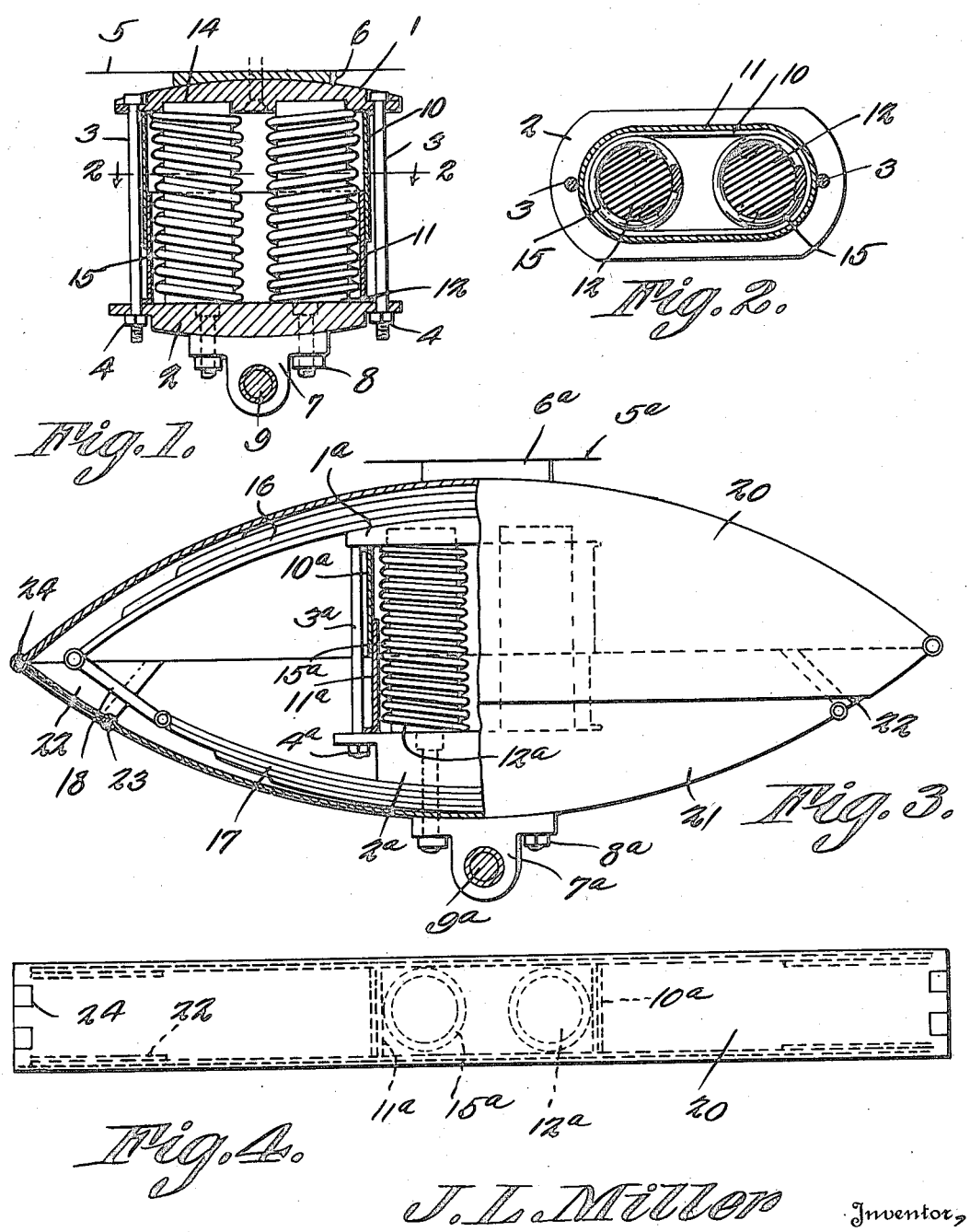

Patented Sept. 11, 1923.

1,467,870

UNITED STATES PATENT OFFICE.

JOHN LEE MILLER, OF FORT COLLINS, COLORADO.

VEHICLE SPRING.

Application filed April 9, 1921. Serial No. 459,900.

*To all whom it may concern:*

Be it known that I, JOHN LEE MILLER, a citizen of the United States, residing at Fort Collins, in the county of Larimer and State of Colorado, have invented a new and useful Vehicle Spring, of which the following is a specification.

It is the object of this invention to provide a simple means whereby the body of a vehicle may be supported resiliently, the device being adapted to be used alone, or in combination with the usual springs of a vehicle.

The invention aims to provide novel means whereby the resilient elements will be housed and protected from dust and the weather.

It is within the province of the disclosure to improve generally and to enhance the utility of devices of that type to which the invention appertains.

With the above and other objects in view, which will appear as the description proceeds, the invention resides in the combination and arrangement of parts and in the details of construction hereinafter described and claimed, it being understood that, within the scope of what is claimed, changes in the precise embodiment of the invention shown can be made without departing from the spirit of the invention.

In the accompanying drawings:—

Figure 1 shows in vertical section, a device constructed in accordance with the invention, parts appearing in elevation; Figure 2 is a section on the line 2—2 of Figure 1; Figure 3 is a side elevation showing a modified form of the invention, parts being broken away and parts appearing in section; and Figure 4 is a top plan of the structure delineated in Figure 3.

In carrying out the invention as shown in Figures 1 and 2, there is provided a head piece 1 and a foot piece 2. Guide rods 3 are secured at their upper ends in the head piece 1, the foot piece 2 sliding upon the rods. Adjusting and stop nuts 4 are threaded on the lower ends of the guide rods 3 and cooperate with the foot piece 2. The numeral 5 denotes a portion of the body or frame work of a motor propelled vehicle. A spacer 6 may be interposed between the body 5 and the head piece 1 if necessary or expedient, the head piece and the spacer being secured in any desired way to the vehicle body or frame. A depending bracket 7 is attached by securing elements 8 to the foot piece 2 and is shaped, in any desired manner, to cooperate with a vehicle axle, indicated at 9.

The device includes a telescopic casing embodying an upper tubular member 10 and a lower tubular member 11, the members of the casing being overlapped slidably on each other at their inner ends. The outer or upper end of the member 10 of the casing is secured to the head piece 1, the outer or lower end of the member 11 being secured to the foot piece 2. Disposed within the telescopic casing are solid resilient posts 12, which may be made of rubber, rubber compound, or any other suitable material. The lower ends of the posts 12 abut against the foot piece 2, the upper ends of the posts being received in the recesses 14 formed in the lower surface of the head piece 1. Helical compression springs 15 surround the posts 12 and abut against the head 1 and the foot piece 2.

It is obvious that a spring mechanism constructed as above described will have the necessary resiliency, the resilient parts of the structure being housed and protected by the casing 10—11 from dust and the weather.

Although the device has been mentioned as being adapted for use on a vehicle, it is to be understood that the word "vehicle" is not to be construed as meaning a four-wheeled wagon. The spring will be of utility, notably in a simplified form, on bicycles, motorcycles and the like.

In Figure 3 of the drawings, the device is shown as being used in connection with an ordinary vehicle spring. Parts hereinbefore described have been designated by numerals previously used, with the suffix "a". The head piece 1ª is placed in abutment with the upper member 16 of the spring, the foot piece 2ª being placed in abutment with the lower member 17 of the spring. In this form of the invention, it may be desirable to interpose a pivotally mounted link 18 in the lower member 17 of the spring.

The resilient structure above described is enclosed within a casing, including an upper member 20, shaped, in general, like the spring 16—17. The casing includes a lower member 21 conforming in shape to the lower member 17 of the vehicle spring. End members 22 are pivoted at 23 to the part 21 of the casing and are pivoted at 24 to the part 20 of the casing, the construction being such that the lower portion of the casing can yield, responsive to the movement of the various springs. The constituent members of the casing are overlapped slidably on each other and serve to protect the resilient portions of the device from the dust and the weather.

Having thus described the invention, what is claimed is:—

In a device of the class described, a spring comprising oppositely bowed members connected at their ends; and a casing enclosing the spring and conforming in shape thereto, the casing comprising a main part approximating the shape of one member of the spring, and an auxiliary part approximating the shape of the other member of the spring, the auxiliary part of the casing being overlapped slidably on the main part of the casing, and including a central section and end sections pivoted thereto, the end sections being pivoted to the main part of the casing.

In testimony that I claim the foregoing as my own, I have hereto affixed my signature in the presence of two witnesses.

JOHN LEE MILLER.

Witnesses:
J. T. MORRISON,
GEO. L. WOLFE.